United States Patent [19]
Meltz et al.

[11] Patent Number: 5,016,967
[45] Date of Patent: May 21, 1991

[54] MULTI-CORE OPTICAL WAVEGUIDE BRAGG GRATING LIGHT REDIRECTING ARRANGEMENT

[75] Inventors: Gerald Meltz, Avon; William W. Morey, West Hartford, both of Conn.

[73] Assignee: United Technologies Corporation, Hartford, Conn.

[21] Appl. No.: 456,439

[22] Filed: Dec. 26, 1989

[51] Int. Cl.$^5$ .............................................. G02B 6/34
[52] U.S. Cl. ................................................. 350/96.19
[58] Field of Search ........................... 350/96.19, 96.11

[56] References Cited
U.S. PATENT DOCUMENTS

| | | | |
|---|---|---|---|
| 3,719,906 | 3/1973 | Tournois | 350/96.19 |
| 3,871,742 | 3/1975 | Kaminow et al. | 350/96.19 |
| 4,725,110 | 2/1988 | Glenn et al. | 350/96.19 |
| 4,776,661 | 10/1988 | Handa | 350/96.19 |

*Primary Examiner*—William L. Sikes
*Assistant Examiner*—Robert E. Wise
*Attorney, Agent, or Firm*—Peter R. Ruzek

[57] ABSTRACT

An optical waveguide light redirecting arrangement includes an optical waveguide having at least two solid portions each of which guides light in a path along a longitudinal axis, with at least one grating region being embedded in each solid portion. Each grating region includes a multitude of grating elements extending at such identical longitudinal spacings and at such an identical angle relative to the longitudinal axis as to redirect light reaching the grating elements between the path of one and the path of the other of the waveguiding portions.

4 Claims, 1 Drawing Sheet

MULTI-CORE OPTICAL WAVEGUIDE BRAGG GRATING LIGHT REDIRECTING ARRANGEMENT

TECHNICAL FIELD

The present invention relates to optical waveguides in general, and more particularly to optical multi-core waveguides, especially fibers, that are provided with embedded light redirecting Bragg gratings.

BACKGROUND ART

There are already known various constructions of optical waveguides, including optical fibers, that are provided with embedded gratings that are being used either for inserting light into or for removing light from the respective optical waveguide at an intermediate location or at different intermediate locations of the waveguide. So, for instance, the U.S. Pat. No. 4,749,248 to Aberson, Jr. et al, issued on June 7, 1988, discloses a device for tapping radiation from, or injecting radiation into, a single mode optical fiber. This patent discloses that it is possible to convert a guided mode in an optical fiber into a tunnelling leaky mode or vice versa by forming a grating of appropriate periodicity at least in the core of the optical fiber, and either to remove the guided mode from the fiber core into the cladding by converting it into the leaky mode, and ultimately from the fiber altogether, or to insert light of an appropriate wavelength into the core to form a guided mode therein by directing light of a proper wavelength from the exterior of the fiber toward the grating to propagate in the fiber cladding and to be converted by the grating into the guided mode in the fiber core. It is disclosed in this patent that the grating may be formed mechanically or by exploiting the photoelastic or photorefractive effect; in either case, the grating is formed in such a manner that fiber core regions of identical optical properties are situated in planes oriented normal to the longitudinal axis of the optical fiber.

While this approach may achieve satisfactory results for some applications, it has an important disadvantage in that it results in very high losses of optical power coupled out of or into the optical fiber. This is at least partially attributable to the fact that, inasmuch as the grating is imposed normal to the longitudinal axis of the core, the conversion of the guided mode into the leaky mode or vice versa takes place with uniform distribution all around the fiber axis, so that a predominant proportion of the leaky mode is not captured by the sensing arrangement when this approach is being used to tap light out of the fiber, or bypasses the fiber core when this approach is being used to launch light into the core via the cladding mode and its conversion into the guided core mode at the grating.

It is also already known, for instance from the commonly owned U.S. Pat. No. 4,725,110, issued on Feb. 16, 1988, to impress periodic gratings into the optical fiber core by exposing the core through the cladding to the interference pattern of two coherent ultraviolet light beams that are directed against the optical fiber at two angles relative to the fiber axis that complement each other to 180°. This results in a situation where the grating is oriented normal to the fiber axis so that it reflects, of the light launched into the fiber core for guided propagation therein in a propagation direction, only that having a wavelength within a very narrow range, back along the fiber axis opposite to the original propagation direction so that such reflected light is guided in the core to the point at which the original light had been launched into the fiber core. On the other hand, this grating is transparent to light at wavelengths outside the aforementioned narrow band so that it does not affect the further propagation of such other light. It may be seen that this approach has its limitations as well in that it is not suited for removing meaningful amounts of light from or launching them into the fiber at any other location than the respective fiber ends in its disclosed form.

This problem has been addressed in a commonly owned copending U.S. patent application Ser. No. 07/456,450. The solution presented there involves writing the grating elements at an oblique angle relative to the longitudinal axis of the waveguiding region, such as of a fiber core, so that the thus formed grating redirects light between a first path extending longitudinally of the waveguiding region, and at least one second path extending between the grating and the exterior of the waveguide in a direction that depends on the axial wavenumber or wavelength of the light being so redirected. This second path has a dimension as considered in the longitudinal direction of the waveguide that substantially corresponds to the associated dimension of the grating. As disclosed in this patent application, the grating of this kind is to be used, in conjunction with a lens or a similar focusing arrangement interposed in the second path, for either redirecting the light out of the waveguide either to a detector or into the core of another optical waveguide through the end face of such other waveguide, or for redirecting light issued by a point or line source or emanating from the end of an optical fiber or a similar waveguide into the waveguiding portion of the waveguide provided with such a grating. However, there are some circumstances under which it would be desirable to use gratings of the above type to achieve communication between two or more adjacent, such as parallel, optical waveguides.

Accordingly, it is a general object of the present invention to avoid the disadvantages of the prior art.

More particularly, it is an object of the present invention to provide at least two adjacent optical waveguides with correlated embedded light redirecting arrangements which do not possess the disadvantages of the known arrangements of this kind.

Still another object of the present invention is to develop the light redirecting arrangements of the type here under consideration in such a manner as to obtain highly efficient coupling of light at a selected wavelength within a limited range between the optical waveguides.

It is yet another object of the present invention to devise an optical system utilizing the embedded grating optical waveguides of the above type, which system is instrumental in providing for the efficient coupling of light into and out of the optical waveguide.

A concomitant object of the present invention is to design the system of the above type in such a manner as to be very simple in construction, inexpensive to manufacture, easy to use, and yet reliable in operation.

DISCLOSURE OF THE INVENTION

In keeping with these objects and others which will become apparent hereafter, one feature of the present invention is embodied in an optical waveguide light redirecting arrangement which includes an optical waveguide having two spaced end portions, and including at least two solid material waveguiding portions each of which is capable of guiding light between the end portions in a respective path extending along a predetermined axis. According to the invention, at least one grating region is embedded in the waveguiding portion at a location remote from the end portions, and has a multitude of grating elements extending at such identical spacings relative to one another as considered in the direction of the axis and at such an angle angle relative to the axis as to redirect light reaching the grating elements between the path of one of the waveguiding portions and the path of the other waveguiding portion. The waveguiding portions may be spaced sufficiently to avoid crosstalk therebetween, and then the grating element angle is an oblique angle of the same or the opposite sense. Alternatively, the waveguiding portions may be close enough to permit crosstalk therebetween, and in this case the gratings act as wavelength selective filters for redirecting forward-going normal mode propagating in the multi-core structure constituted by the waveguiding portions and having the selected wavelength back as a backward-going normal mode in the waveguide structure.

BRIEF DESCRIPTION OF THE DRAWING

The present invention will be described in more detail below with reference to the accompanying drawing in which.

BEST MODE FOR CARRYING OUT THE INVENTION

Figure 1:
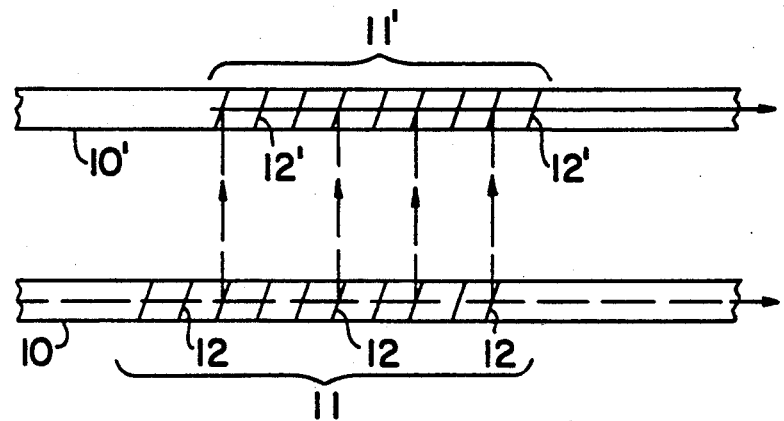
FIG. 1 is a considerably enlarged axial sectional view of two optical fiber cores each provided with an embedded grating region in accordance with the present invention for use in redirecting light between the fiber cores.

Referring now to the drawing in detail, and first to FIG. 1 thereof, it may be seen that the reference numerals 10 and 10' have been used therein to identify respective optical waveguides. The optical waveguides 10 are shown to be configured as optical fiber cores, of each of which only a relatively short longitudinal portion is depicted. If so desired, a non-illustrated fiber cladding could be arranged, as is well known in the optical fiber field, either individually around each, or commonly around both, of the fiber cores 10 and 10'. Each of the fiber cores 10 and 10' incorporates a respective grating region 11 or 11' that includes a multitude of grating elements 12 or 12'. The grating regions 11 and 11' are shown to be substantially coextensive with one another.

At this juncture, it may be appropriate briefly to describe the arrangement disclosed in the aforementioned U.S. patent application Ser. No. 07/456,450, as much of which as needed to fully appreciate and/or understand the present invention is incorporated herein by reference, so as to aid in understanding the problem with which the present invention successfully deals. In that arrangement, each of the grating elements extends at substantially the same oblique angle α with respect to the longitudinal axis of the core, and the grating elements are spaced the same distance from one another as considered in the longitudinal direction of the optical fiber. The grating elements are formed in the grating region of the core, which is preferably of a germanium-doped silica or similar glass that is capable of having the grating elements written, impressed or otherwise applied or embedded therein, by application of an interference pattern of two ultraviolet radiation beams to the core. The thus produced periodic grating elements then constitute refractive index perturbations that are permanently induced in the core by exposure to ultraviolet radiation. This method makes use of a first order absorption process in response to transverse irradiation of the fiber 10 with light in the ultraviolet absorption band of the core material. Inasmuch as the grating is formed by illuminating the core from the side, preferably through the cladding and without affecting the latter, with two coherent beams that are incident on the optical fiber symmetrically to a plane extending at the oblique angle α with respect to the longitudinal axis of the core, the intensity peaks of an interference pattern resulting from interference of the coherent incident beams, and thus the grating elements, extend parallel to this plane and the spacings between the grating elements are the same. Such exposure induces permanent refractive index changes in the grating region, in effect creating a phase grating effective for redirecting light reaching the grating.

While only a quite small portion of the light propagating through the fiber core or being launched into the core is redirected at each of the grating elements as a result of the refractive index changes attributable to the presence of the grating elements, subsequently to either leave the optical fiber or to be launched into the core for guided longitudinal propagation therein, respectively, the cumulative effect of the grating elements is the redirection of a significant proportion of the light the wavelength of which is in a very narrow range around the center wavelength λ that is in a predetermined ratio to the periodicity of the grating elements. Furthermore, the light within the narrow range that is thus redirected at any one of the grating elements out of the optical fiber is in such a phase relationship with respect to the light redirected at any other of the grating elements that the cumulative redirected light beam has a substantially planar wavefront so that substantially none of the thus escaping redirected light is lost to destructive interference or diffraction. Moreover, the thus escaping redirected light beam propagates outside the optical fiber along a single direction determined by the aforementioned oblique angle α, albeit with some fanning out in the circumferential direction, rather than all around the optical fiber; this facilitates the capture of the thus escaping light and increases the proportion of such light that is actually captured.

By the same token, when coherent light is being launched into the optical fiber core, it is sufficient to direct all of the power of such light all over the grating region along a single direction substantially coincident with the aforementioned path and including the requisite angle α with the longitudinal axis of the core, rather than having to distribute such power all around the optical fiber and, to the extent that such power is carried by light having a wavelength within the aforementioned narrow range around the center wavelength λ, a meaningful proportion of such directed light power will be redirected into the core for guided longitudinal propagation therein even though only a small portion of such light is redirected at each of the grating elements. This effect is attributable to the constructive interference between the partial light amounts which have been redirected at the respective grating elements with the partial light amounts redirected at the longitudinally consecutive ones of the grating elements. The constructive interference is not limited to a single value of the central wavelength $\lambda$; however, the angle of the external path that results in the constructive interference is peculiar to the respective central wavelength $\lambda$.

Turning now once more to FIG. 1 of the drawing, it is to be mentioned first that the concepts shown therein (as well as in FIG. 2 of the drawing) are based on the principles described above. Here again, the grating elements 12 and 12' are inscribed in the respective core or waveguide 10 or 10' by exposing the grating region of the latter to an interference pattern of two incident ultraviolet light beams, either individually or in common. The grating elements 12 and 12' are so spaced from one another that the gratings 11 and 11' consisting thereof are operative for redirecting light in a range about the same central wavelength, and they are shown to be so oriented that, as indicated by respective arrows in FIG. 2, light of the aforementioned wavelength that is launched into the left-hand end of the waveguide 10 is redirected by the grating 10 for propagation toward the grating 10' which then redirects the light reaching the same in this manner into the waveguide 10' for further propagation therein toward the right-hand end of the waveguide 10'. However, it is also possible, and contemplated by the present invention, to give the grating elements 12' an orientation opposite to that of the grating elements 12, if so desired. In this case, the light that is launched into one of the ends of the waveguide 10 and that is affected by the grating 11 is redirected by the grating 11' to travel in the opposite direction. The opposite is also true in both instances, that is, light of the appropriate wavelength that is launched in an appropriate direction into the waveguide 10' is redirected by the combined action of the gratings 11' and 11 into the waveguide 10.

As mentioned before, the light redirected out of the respective waveguide (say 10) by the action of the grating 11 forms a fan of a significant dimension in the circumferential direction of the waveguide 10 when the latter is constituted by an optical fiber core. Thus, more than one of the waveguides 10' can be situated within such fan region, and the grating 11' of each of them will then receive and redirect a portion of the light previously redirected by the grating 11 into the fan.

In both of these situations, the waveguides 10 and 10' are spaced from one another by a distance sufficient to eliminate unintended crosstalk between them at all wavelengths of interest as a result of overlap or coincidence of the evanescent fields thereof.

Figure 2:
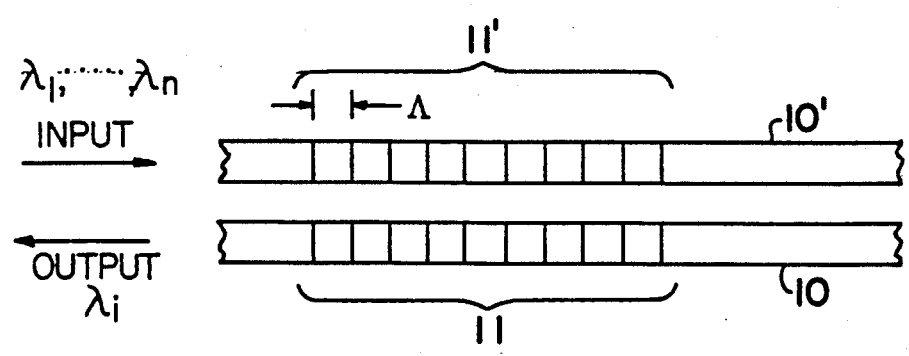
FIG. 2 is a view similar to that of FIG. 1 but showing the optical fibers situated close enough to one another for crosstalk and provided with backwardly redirecting Bragg filter gratings.

FIG. 2 of the drawing depicts a situation in which the waveguides 10 and 10' are arranged in such a proximity to one another as to constitute a coupled multi-core waveguiding structure; however, only two such waveguides 10 and 10' are shown in the drawing. As is well known, there is cross-talk between the forward-propagating normal modes in the two cores or waveguides 10 and 10' under these circumstances. According to the present invention, the waveguides 10 and 10' are provided with respective substantially coextensive gratings 11 and 11' that are shown to consist of grating elements 12 and 12' extending normal to the longitudinal axes of the waveguides 10 and 10'. The gratings 11 and 11' constitute a stopband filter for one of the normal modes in this waveguiding structure. This is achieved in that the gratings 11 and 11' impressed in the waveguides 10 and 10' by the action of two interfering coherent ultraviolet light beams act as high reflectivity Bragg gratings of a periodicity that couples a forward propagating normal mode to a corresponding backward propagating normal mode. So, for instance, during the use of a twin-core fiber of the above type, one core is illuminated in its longitudinal direction with a set or continuous spectrum of wavelengths $\lambda_1, \lambda_2, \ldots, \lambda_i, \ldots, \lambda_n$. The Bragg gratings 11 and 11' then resonantly couple, for instance, the forward-going symmetric mode at $\lambda_i$ into a corresponding backward propagating symmetric mode. Thus, light at $\lambda_i$ is filtered out from the input core and redirected back out the other core.

While the present invention has been illustrated and described as embodied in particular constructions of optical waveguide structures, it will be appreciated that the present invention is not limited to this particular example; rather, the scope of protection of the present invention is to be determined solely from the attached claims.

We claim:

1. A multi-core optical waveguide light redirecting arrangement comprising:
   an optical waveguide having two spaced end portions and including at least two solid material waveguiding portions of substantially constant cross sections and each capable of guiding light between said end portions in a path extending along a predetermined axis and arranged substantially parallel to one another at a predetermined transverse distance from one another; and
   a grating region embedded in each of said waveguiding portions between said end portions and substantially coextensively with said grating region of the respectively other of said waveguiding portions, each of said gratings having a multitude of grating elements constituted by periodic index of refraction variations and extending at substantially identical periodic spacings as considered in the direction of said axis and at substantially the same angle relative to said axis to redirect light reaching said grating elements and having a wavelength in a range depending on said periodic spacings between said path of a first of said waveguiding portions and that of a second of said waveguiding portions.

2. The arrangement as defined in claim 1, wherein said distance is sufficient to substantially eliminate crosstalk between said waveguiding portions at any wavelength of interest; and wherein said predetermined angle is an oblique angle that has substantially the same value for both of said grating regions.

3. The arrangement as defined in claim 2, wherein said oblique angle of said grating elements of one of said grating regions has a sense opposite to that of said grating elements of the other of said grating regions.

4. The arrangement as defined in claim 1, wherein said grating elements extend substantially normal to the respective axes of said gratings; and wherein said distance is small enough for said waveguiding portions to constitute a coupled multi-core waveguiding structure with each of said waveguiding portions being capable of guiding at least one normal mode at a selected wavelength in both a forward and a backward direction and, for at least said one normal mode to couple between said waveguiding portions with attendant at least partial redirection of said one mode propagating in one of said waveguiding portions in said forward direction toward one of said gratings into the other of said waveguiding portions to propagate therein in said backward direction as a corresponding normal mode of said selected wavelength.

* * * * *